United States Patent [19]

Murray

[11] Patent Number: 4,501,407

[45] Date of Patent: Feb. 26, 1985

[54] SOLENOID ACTUATED FLUID CONTROL VALVE

[75] Inventor: Myles N. Murray, Chagrin Falls, Ohio

[73] Assignee: Industrial Electronic Rubber Company, Twinsburg, Ohio

[21] Appl. No.: 407,074

[22] Filed: Aug. 11, 1982

[51] Int. Cl.³ .............................................. F16K 31/02
[52] U.S. Cl. .................................. 251/141; 251/204;
251/333; 251/357; 123/407
[58] Field of Search ............... 251/357, 333, 334, 141, 251/284; 123/407

[56] References Cited

U.S. PATENT DOCUMENTS

| | | | |
|---|---|---|---|
| 2,863,628 | 12/1958 | Rimsha et al. | 251/141 |
| 2,876,982 | 3/1959 | Snider | 251/357 |
| 2,929,401 | 3/1960 | Cowan | 251/333 |
| 3,082,359 | 3/1963 | Mangiafico et al. | 251/141 |
| 3,420,260 | 1/1969 | Wisniewski | 251/141 |
| 3,467,357 | 9/1969 | Schomer et al. | 251/333 |
| 3,523,676 | 8/1970 | Barker | 251/141 |
| 4,388,083 | 6/1983 | Furuya et al. | 123/407 |

Primary Examiner—A. Michael Chambers
Attorney, Agent, or Firm—Maky, Renner, Otto & Boisselle

[57] ABSTRACT

A solenoid actuated fluid control valve comprises a porting member including a port and a conical valve seat circumscribing the port, and a relatively movable port closing valve element such as a needle valve element including a resilient conical tip. The valve seat and tip are correspondingly tapered and a small annular bead is provided on the resilient tip which provides for initial and preferably total sealing of the valve. Also provided is a suitable stop such as a shoulder on the needle valve element body adjacent the resilient conical tip thereon which engages an opposed surface on the porting member to prevent overcompression of the resilient conical tip and preferably to limit sealing contact to the area of the sealing bead.

21 Claims, 2 Drawing Figures

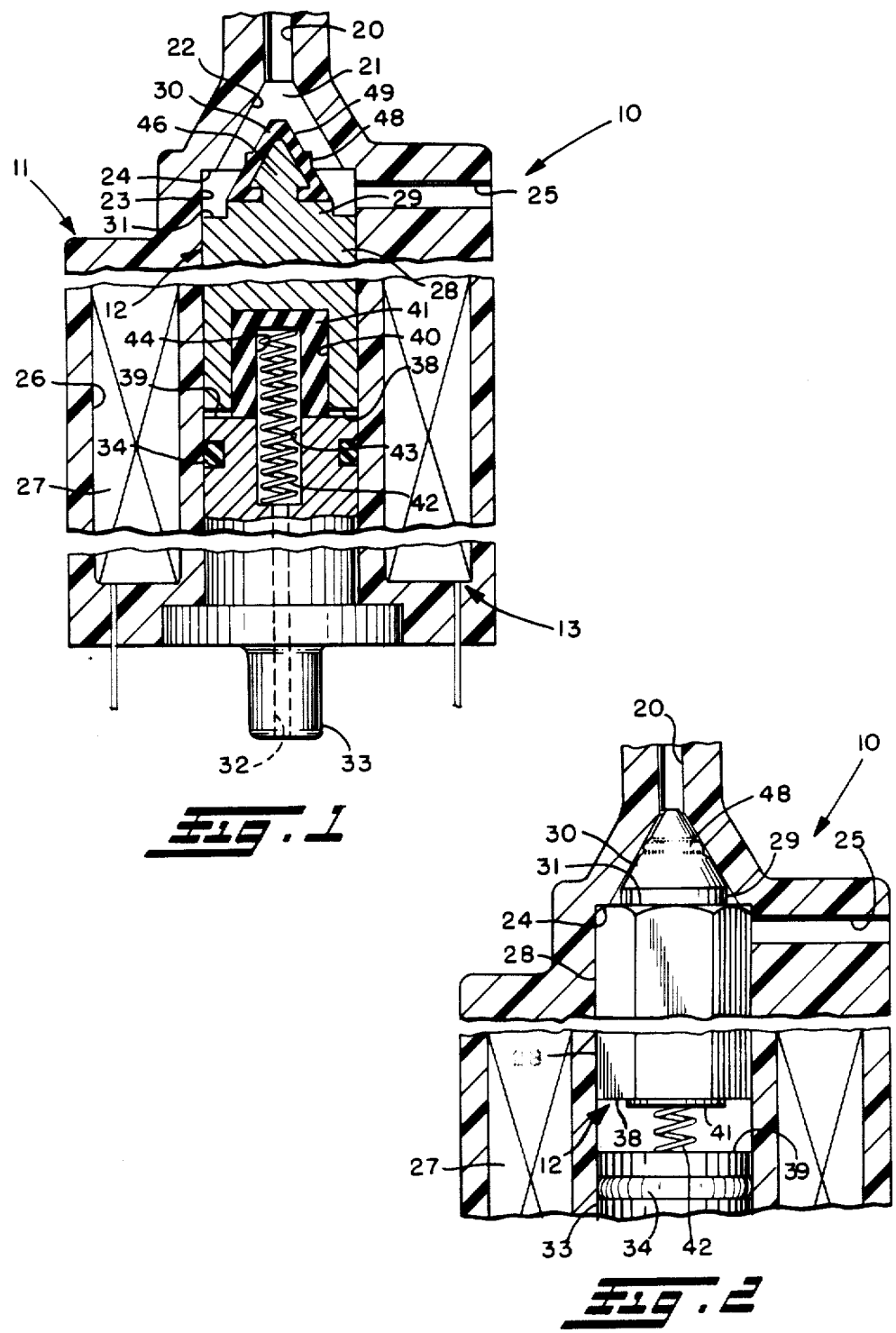

4,501,407

SOLENOID ACTUATED FLUID CONTROL VALVE

This invention relates generally to fluid flow control devices and, in particular, to fluid control valves having particular application in air management systems of vehicle engines. Still more particularly, the invention relates to constant duty, solenoid actuated vacuum control valves including resilient conical tip needle valve elements and correspondingly tapered valve seats.

BACKGROUND OF THE INVENTION

Constant duty, solenoid actuated vacuum control valves commonly are employed in air management systems of vehicle engines to direct, for example, either carburetor spark port vacuum or atmospheric pressure to the distributor's vacuum advance mechanism. Such vacuum valves typically operate at relatively high frequency and have employed a resilient conical tip needle valve element operatively actuated by a solenoid. To effect closure of one valve port, the resilient conical tip of the needle valve element is moved into sealing engagement with a conical valve seat which may be correspondingly tapered for full surface sealing contact.

Because the vacuum control valves typically operate at relatively high frequency, it has been found necessary to limit compression of the resilient conical tip upon closure thereof in order prevent the tip from being scrubbed away or forced through the valve seat opening or port by the action of the valve. For this purpose, the rigid body of the needle valve element has been provided with a stop surface adjacent the larger diameter end of the resilient conical tip. Upon closure of the valve seat port, the stop surface engages an opposed surface on the valve seat body after the resilient conical tip has engaged the correspondingly tapered valve seat and compressed sufficiently to effect a seal, and such engagement prevents further closing movement of the needle valve element thereby to preclude overcompression and scrubbing of the resilient conical tip. Typically, compression of the resilient conical tip is limited to a few thousandths of an inch.

Known vacuum control valves of the foregoing type, however, have drawbacks. In order to obtain desired sealing and compression of the resilient conical tip, the valve members must be formed and positioned within close tolerance. Otherwise, the valve may not fully close or too much compression of the resilient conical tip may result and cause scrubbing and hence failure of the resilient conical tip. In either case, the valve will not function properly.

In addition, the taper of the resilient conical tip must be precisely matched to the taper of the conical valve seat. Otherwise, undesirable variations in the operating voltage of the solenoid may occur in those valves in which the solenoid operates upon energization to unseat the resilient conical tip against differential pressure forces action thereon. If the taper mismatch is such that sealing is effected at the wide diameter end of the conical valve seat, a greater operating voltage would be required to unseat the resilient conical tip against the differential pressure normally acting to close the tip against the valve seat. Conversely, less operating voltage would be required if the taper mismatch is such that the seal is effected at the narrower or smaller diameter end of the conical valve seat.

SUMMARY OF THE INVENTION

The present invention provides an improved fluid flow control valve of the type employing correspondingly tapered conical or annular sealing surfaces of which one is resilient and compressible. The control valve is characterized by a small annular ridge or bead on the resilient conical sealing surface which provides for initial and preferably total sealing of the valve.

In particular, a control valve according to the invention comprises a porting member including a port and a conical valve seat circumscribing the port, and a relatively movable port closing valve element such as a needle valve element including a resilient conical tip. The valve seat and tip are correspondingly tapered and, as indicated, a small annular bead is provided on the resilient tip for engagement and disengagement with the conical seat. Also provided is a suitable stop such as a shoulder on the needle valve element body adjacent the larger diameter end of the resilient conical tip which engages an opposed surface on the porting member to prevent overcompression of the resilient conical tip and preferably to limit sealing contact to the area of the sealing bead.

With the control valve of the invention, the valve components need not be positioned within the heretofore required close tolerance to ensure an effective and durable seal as the annular sealing bead will accommodate a greater amount of mispositioning and tolerance variations. In addition, sealing will be effected at essentially the same axial location on the conical seat regardless of any taper mismatch between the seat and tip so that variations in port opening forces of the valve will be relatively small. Moreover, the valve is highly durable in that all the rubber of the resilient tip will not compress as quickly during valve port closure, but instead only the rubber of the annular sealing bead and adjacent rubber of the resilient tip. That is, the bead will compress into the tip as it engages the seat, and this substantially reduces scrubbing of the bead and resilient tip.

These and other features and advantages of the present invention will be more readily appreciated from a reading of the following detailed specification and the accompanying drawing.

BRIEF DESCRIPTION OF THE DRAWING

In the annexed drawing:

FIG. 1 is a partly schematic, fragmentary longitudinal section through a three-way fluid flow control valve according to the present invention, showing one operative condition of the valve; and FIG. 2 is a partly schematic, fragmentary longitudinal section similar to that of FIG. 1, but showing the other operative condition of the valve.

DETAILED DESCRIPTION

Referring now in detail to the drawing, a fluid flow control valve according to the invention is designated generally by reference numeral 10. The illustrated valve 10 is of the three-way type and the two operative conditions thereof are shown in FIGS. 1 and 2.

The valve 10 generally comprises a porting and housing member 11, a relatively movable needle valve element 12 and a valve actuator. The actuator may include, for example, an electrically controlled solenoid 13 which, in an air management system of a vehicle engine, may be operatively connected to the engine's electronic command. To facilitate an understanding of the operation of the illustrated valve, reference will be had to the manner in which the valve may be used in such an air management system of a vehicle engine. It however will be appreciated that the valve may have other applications and uses as well.

The porting and housing member 11, preferably of plastic, includes an axial passage 20 which may be operatively connected, for example, to a spark port vacuum line of a vehicle engine. The axial passage 20 terminates at a port 21 which is circumscribed by a conical valve seat 22. The port 21 opens to a cylindrical bore 23 which has a diameter larger than that of the conical valve seat at its larger diameter end whereby an annular radially extending shoulder or surface 24 is formed at the junction of the valve seat and cylindrical bore. The porting and housing member also includes a radial passage 25 which opens to the cylindrical bore 23 at its end adjacent the valve seat 22 and an annular chamber 26 which houses the coils 27 of the solenoid 13. As shown, the coils 27 surround the middle portion of the cylindrical bore 23.

The needle valve element 12 is housed within the cylindrical bore 23 of the porting and housing member 11 and includes an elongated body 28, preferably of metal, a cylindrical extension or neck 29 and a resilient conical tip 30. It can be seen that the neck has a diameter smaller than that of the body whereby a shoulder or stop surface 31 is formed on the body in axial opposition to the surface 24 adjacent the valve seat 22.

The body 28 of the needle valve element 12 is closely fitted in the cylindrical bore 23 for guided axial movement therein, but is of noncircular cross section whereby several fluid flow paths are provided along the length of the body for connection of the radial passage 25 with a central axial passage 32 provided in a metal core element 33 of the solenoid 13. The core element 33 is housed in the cylindrical bore 23 in axial alignment with the needle valve element 12 and is sealed at its outer diameter to the cylindrical bore 23 by an O-ring 34. In the indicated application, the passage 32 may be connected to atmospheric pressure whereas the passage 25 may be connected to the vacuum advance mechanism of the engine's distributor.

The body 28 of the needle valve element 12 and the core element 33 have axially opposed end faces 38 and 39, respectively. The body 28 also has a central axial bore 40 which opens to the end face 38 and has a sealing element 41 fitted or molded therein. The sealing element 41 preferably is made of a suitable synthetic rubber for effecting sealing engagement with the end face 39 of the core element 33. As shown, the sealing element 41 has an annular side wall which axially projects slightly beyond the end face 38 of the body 28 for effecting such sealing engagement with the core element face 39 upon shifting of the needle valve element 12 to the position thereof shown in FIG. 1, this occurring upon energization of the solenoid 13. Accordingly, the sealing element 41 provides an annular seal about the axial passage 32 at its end opening to the end face 39 of the core element which blocks communication between such axial passage and the radial passage 25.

It is noted here that the needle valve element 12 is normally urged to the FIG. 2 position thereof by a spring 42 when the solenoid 13 is not energized. Opposite ends of the spring 42 respectively are received in an enlarged diameter portion 43 of the axial passage 32 in the core element 33 and in the cylindrical area 44 defined by the annular side wall of the sealing element 40 as shown.

Referring now more particularly to the resilient conical tip 30, such preferably is made of a suitable synthetic rubber and is locked to the body 28 by a spear-like projection 46 on the neck 29. The tip preferably is molded directly on the body with the spear-like projection being thusly embedded therein. In addition, the taper of the tip closely corresponds to the taper of the conical valve seat 22.

As seen in the drawing, a small annular sealing ridge or bead 48 is provided on the conical sealing surface 49 of the resilient tip 30. Preferably the bead is integral with the tip and circumscribes the tip about midway along its axial length. The bead may be rounded or, to facilitate molding thereof, may have the illustrated generally triangular cross sectional shape. As shown, the bead has a radially outer cylindrical surface coaxial with the tip and a radially extending annular end surface.

In typically encountered sizes of needle valve elements, the bead 48 need only project a few thousandths of an inch beyond the conical surface 49 of the tip 30 or more particularly about three to four thousandths of an inch. Generally, the bead projection will be on the order of the amount of tip compression desired in conventional valves of the above described type.

In use, selective fluid communication between the radial passage 25 and the passages 20 and 32 is controlled by movement of the valve element between its positions seen in FIGS. 1 and 2. Energization of the solenoid 13 will move the needle valve element to its FIG. 1 position which effects communication between the passages 20 and 25 and blocks communication between the passages 25 and 32. Upon deenergization of the solenoid, the needle valve element will move to its FIG. 2 position by the action of the spring 42 and differential pressure forces acting thereon by reason of the passage 20 being connected, as indicated, to a vacuum line. When in its FIG. 2 position, the needle valve element will effect communication between the passages 25 and 32 and block communication between the passages 20 and 25 in the manner more particularly described hereinafter.

As seen in FIG. 2, the stop surface or shoulder 31 on the needle valve element body 28 will engage the opposed surface 24 adjacent the valve seat 22 to prevent further closing movement of the needle valve element against the conical valve seat. This occurs at least after the annular bead 48 has engaged the conical valve seat and been substantially compressed into the resilient conical tip 30. However, the opposed shoulder 31 and surface 24 preferably cooperate to limit closing movement of the valve element so that all sealing is effected by the annular bead and not by full surface contact between the conical sealing surfaces of the tip and seat.

In view of the foregoing, the valve components need not be formed and positioned within the heretofore required close tolerance in order to ensure an effective and durable seal, it being appreciated that the annular sealing bead 48 can accommodate a greater amount of mispositioning and non-precision. Moreover, all of the rubber of the resilient conical tip 30 will not compress as quickly, but instead only the rubber of the annular bead 48 and the adjacent rubber of the tip. That is, the bead will compress into the tip as the bead engages the seat. This prevents the bead from being scrubbed away and thus provides a durable valve seal.

In addition, essentially a line seal will always be effected by the sealing bead 48 at about the middle of the conical valve seat 22. Accordingly, the effective pressure area of the valve element upon which differential valve pressures act will be the same even though the taper of the resilient conical tip 30 does not precisely match the taper of the conical valve seat 22. This accordingly will reduce or eliminate variations in the operating voltage of the solenoid 13.

It also should be appreciated that advantageous results may be obtained by a control valve wherein the valve seat is resilient and the valve tip is rigid. In addition, advantageous results may be obtained by a control valve wherein the annular bead, whether resilient or rigid, is provided on the valve seat.

Although the invention has been shown and described with respect to a preferred embodiment, it is obvious that equivalent alterations and modifications will occur to others skilled in the art upon the reading and understanding of the specification. The present invention includes all such equivalent alterations and modifications, and is limited only by the scope of the following claims.

The embodiments of the invention in which an exclusive property or privilege is claimed are defined as follows:

1. In a fluid control valve comprising a porting member including a port and a conical valve seat circumscribing said port, and port closing means including a valve element having an elongated rigid body and a resilient conical tip secured at one end of said rigid body, said valve seat and tip being correspondingly tapered and said porting member and valve element being relatively movable to open and close said port at said valve seat and tip, the improvement comprising a relatively small, annular sealing bead on, concentric with, and projecting from the correspondingly tapered surface of said tip for effecting sealing engagement between said tip and seat; in combination with stop means provided to limit the amount of compression of said annular bead and tip when engaged with said valve seat.

2. The improvement of claim 1 wherein said annular bead is integral with said resilient tip.

3. The improvement of claim 2 wherein said annular bead circumscribes said resilient tip at about the middle thereof.

4. The improvement of claim 1 wherein said stop means includes a shoulder on said rigid body adjacent said resilient tip and an opposed abutment surface on said porting member adjacent said valve seat.

5. The improvement of claim 1 wherein solenoid means are provided for moving said body and tip to open and close said port.

6. The improvement of claim 1 wherein said stop means limits sealing contact substantially to the area of said sealing bead.

7. The improvement of claim 1 wherein said sealing bead projects from the surface of said tip on the order of the amount of compression permitted by said stop means.

8. The improvement of claim 1 wherein said valve seat and conical tip are evenly tapered.

9. A solenoid actuated fluid flow control valve comprising a porting body including a port and a tapered valve seat circumscribing said port; port closing means including a valve element having a tapered tip, said valve seat and tip having correspondingly tapered annular sealing surfaces, one of which is resilient and has a relatively small annular sealing ridge thereon, concentric therewith, and projecting from the correspondingly tapered surface thereof; solenoid means for effecting relative movement between said porting body and valve element to open and close said port at said valve seat and tip; and stop means to limit the extent of the amount of compression of said one of said valve seat and tip when engaged with the other.

10. The valve of claim 9 wherein said annular sealing ridge circumscribes said one of said valve seat and tip at about the middle thereof.

11. The valve of claim 9 wherein said stop means limits sealing contact substantially to the area of said sealing ridge.

12. The valve of claim 9 wherein said stop means includes cooperating rigid abutments on said porting body and valve element.

13. The valve of claim 12 wherein said valve element includes an elongated rigid body, said resilient tip is secured at one end of said rigid body, and said abutments include a shoulder on said rigid body adjacent said resilient tip and an opposed abutment surface on said porting body adjacent said valve seat.

14. The valve of claim 9 wherein said porting body is fixed and said solenoid means moves said valve element to open and close said port.

15. The valve of claim 9 wherein said valve seat and tip are evenly tapered.

16. A solenoid actuated fluid flow control valve comprising a porting body including a port and a tapered valve seat circumscribing said port; port closing means including a valve element having a tapered tip, said valve seat and tip having correspondingly tapered annular sealing surfaces, one of which is resilient and one of which has a relatively small annular sealing ridge thereon, concentric therewith and projecting from the correspondingly tapered sealing surface thereof; solenoid means for effecting relative movement between said porting body and valve element to open and close said port at said valve seat tip; and stop means to limit the extent of relative closing movement to limit the amount of compression of said one of said valve seat and tip which is resilient when engaged with the other.

17. The valve of claim 16 wherein said stop means limits sealing contact substantially to the area of said sealing ridge.

18. The valve of claim 16 wherein said stop means includes cooperating rigid abutments on said porting body and valve element.

19. The valve of claim 18 wherein said valve element includes an elongated rigid body, said tip is resilient and is secured at one end of said rigid body, and said abutments include a shoulder on said rigid body adjacent said resilient tip and an opposed abutment surface on said porting body adjacent said valve seat.

20. The valve of claim 16 wherein said porting body is fixed and said solenoid means moves said valve element to open and close said port.

21. The valve of claim 16 wherein said valve seat and tip are evenly tapered.

* * * * *